A. ROY.
ORE CAR.
APPLICATION FILED JAN. 6, 1920.
1,392,801.
Patented Oct. 4, 1921.
2 SHEETS—SHEET 1.
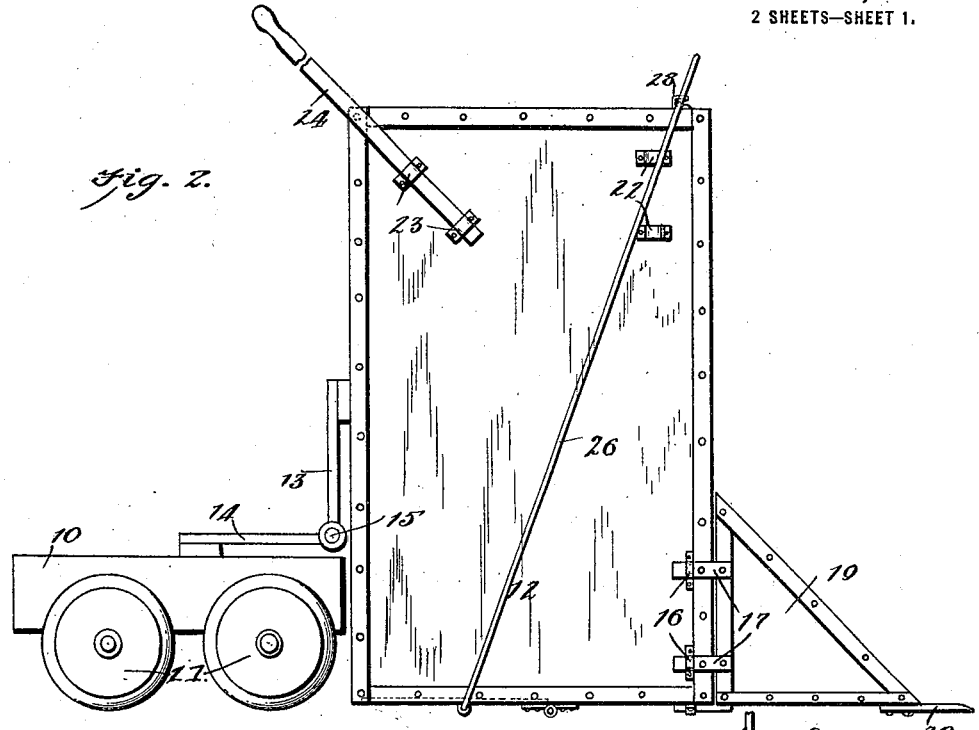
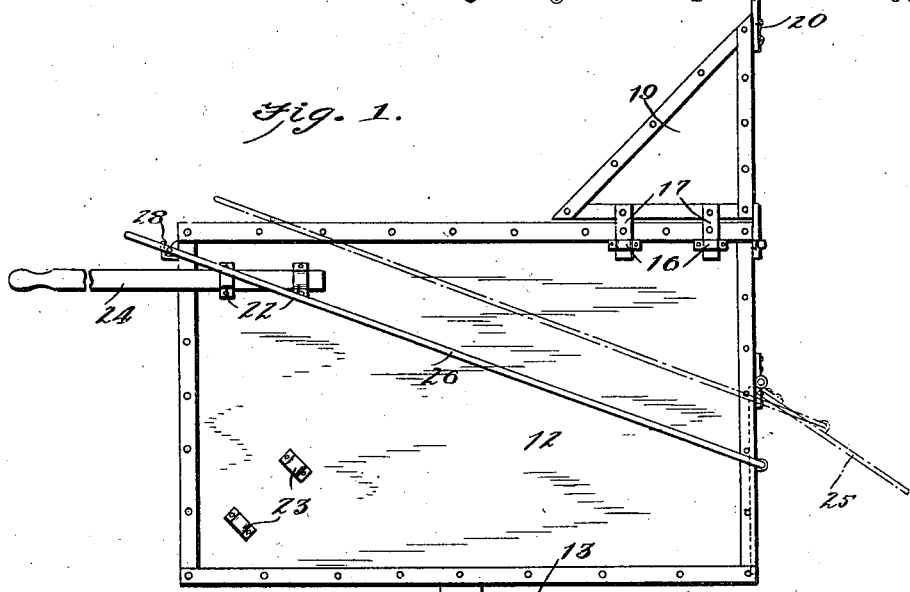
WITNESSES
INVENTOR
ALEXANDER ROY,
BY
ATTORNEYS

A. ROY.
ORE CAR.
APPLICATION FILED JAN. 6, 1920.

1,392,801. Patented Oct. 4, 1921.
2 SHEETS—SHEET 2

WITNESSES

INVENTOR
ALEXANDER Roy,
BY
ATTORNEYS

UNITED STATES PATENT OFFICE.

ALEXANDER ROY, OF HILL CITY, SOUTH DAKOTA.

ORE-CAR.

1,392,801.     Specification of Letters Patent.     Patented Oct. 4, 1921.

Application filed January 6, 1920. Serial No. 349,698.

*To all whom it may concern:*

Be it known that I, ALEXANDER ROY, a subject of the King of Great Britain, and a resident of Hill City, in the county of Pennington and State of South Dakota, have invented certain new and useful Improvements in Ore-Cars, of which the following is a specification.

My present invention relates generally to ore cars and more particularly to a self loading car, my object being the provision of a device of this nature, the body of which, is movably mounted with respect to its wheeled truck and is shiftable to a position permitting the same to act as a scoop.

More particularly, my invention aims at the provision of a car of this nature, the body of which is hinged in connection with its truck and is provided with a normally upstanding shovel extension at its front end, so that when the body is tilted to vertical position, the shovel and the body act as a scoop in order to provide for self filling of the car body by simply forcing its shovel extension into an ore pile.

Figure 3:
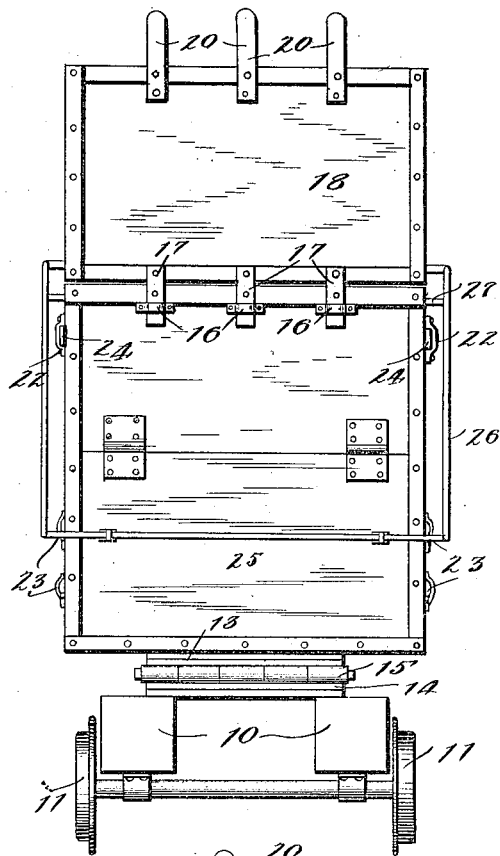

In the accompanying drawings which illustrate my present invention and form a part of this specification, Figure 1 is a side elevation with the body of the car in normal position, Fig. 2 is a similar view, showing the body tilted to vertical position to act as a scoop, Fig. 3 is a front elevation with the parts in the position shown in Fig. 1.

Figure 4:
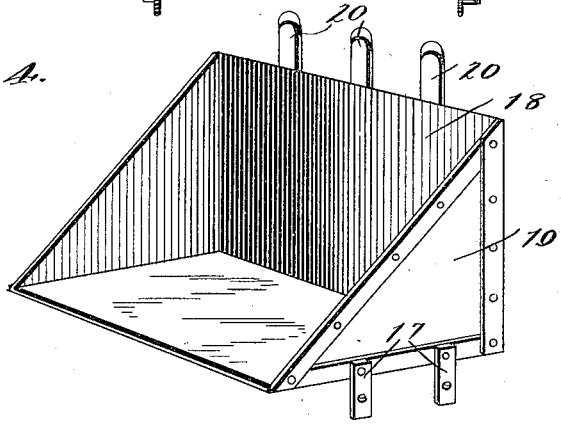

Fig. 4 is a detail perspective view of the shovel extension removed.

Referring now to these figures, my invention contemplates an ore car, the truck 10 of which is mounted upon wheels 11 and the body 12 of which is secured to one leaf 13 of a hinge, the other leaf 14 of which is secured to the truck 10, with the pintle 15 of the hinge at or about the vertical plane of the front end of the truck and extending transversely thereof.

This arrangement of the hinge, together with the particular disposition of the body 12 with respect thereto, as seen by a comparison of Figs. 1 and 2, permits the body to be swung from the horizontal position of Fig. 1, to the vertical position of Fig. 2, so that its front end descends to the level of the wheel bases.

The body 12 is preferably of rectangular form and opens upwardly as usual, so that when it is turned to the vertical position of Fig. 2, its opening is directed forwardly. Along the upper portion of its front edge and the forward portions of its side edges, the body 12 has brackets 16 into which the stakes 17 of the rectangular front 18 and the triangular sides 19 of the shovel extension are removably mounted.

The free edge of the front 18 of this shovel extension has projecting teeth 20 to facilitate entry of said edge of the shovel extension into an ore pile and it is obvious that when the body 12 is turned to the vertical position of Fig. 2, the shovel extension whose front 18 is coextensive with the front of the body 12, is thus adapted to be forced into an ore pile by pressure supplied in any suitable manner against the rear of the truck 10. This pressure may be brought about by bumping of other cars or a locomotive against the truck, or by levering with crow bars or the use of jacks.

To facilitate movement of the body 12 between its normal horizontal position, and its vertical loading position, the rear portions of its two sides have upper and lower sets of brackets 22 and 23 respectively, the brackets of the upper set 22 being horizontally alined and the brackets of the lower sets 23 being inclined.

With these brackets, handle bars 24 are adapted to be detachably associated, so that these bars, whose normal positions are horizontal in engagement with the brackets 22 as in Fig. 1, may be detached from these brackets and extended into the inclined brackets 23 when the body is to be tilted to the vertical loading position as seen in Fig. 2 and from this latter position shifted again to the normal horizontal position, as seen in Fig. 1.

It is thus obvious that my invention provides an ore car of simple construction, which will be self-loading in its nature, which may be readily manipulated, *i. e.,* moved from its normal to its dumping position and vice versa, and which will be strong and durable in use.

By reference to Figs. 1, 2 and 3 in particular it will be noted that one end wall of the car has a door 25 for discharge purposes, controlled by a handle 26 the latter of which is in the nature of a frame and extends rearwardly and upwardly and is provided with a cross bar 27 shiftable into and out of engagement with a catch 28 at the upper portion of the opposite end of the car, which serves to normally retain the door 25 in closed position. This door is readily releasable by simply lifting the rear end of the handle free of the catch 28 and above the upper rear edge of the car body as indicated in dotted lines in Fig. 1.

I claim:—

1. An ore car comprising a horizontal wheeled truck, an upwardly opening body normally disposed in horizontal position on the truck and hingedly connected thereto for movement to a vertical position opening forwardly of the truck, and a shovel extension detachably supported in connection with the body for the purpose described.

2. An ore car comprising a wheeled truck, an upwardly opening body normally disposed in horizontal position on the truck and hingedly connected thereto for movement to a vertical position forwardly of the truck having front, side and rear walls, and a shovel extension detachably associated with the forward portion of the edge of the body having sides and a front plate the latter of which alines with the front wall of the body.

3. An ore car comprising a wheeled truck, an upwardly opening body normally disposed on the truck, a hinged connection between the truck and body located approximately above the forward end of the truck, a shovel extension detachably supported in connection with the forward portion of the body, handle bars, and separate supporting sockets for the handle bars in parallel and angular positions relative to the body.

4. An ore car comprising a wheeled truck, a body hinged to the truck, and movable between a normal horizontal position and a vertical loading position, the forward end of the said body depending below the truck in vertical loading position, a shovel extension having front and side plates to coincide with the front wall and portions of the side walls of the body, said body having brackets at its upper edge along its front wall and portions of its side walls, and said shovel extension having front and side stakes along its front and side plates detachably associated with the brackets, as described.

5. An ore car comprising a wheeled truck, a body hinged to the truck, and turnable on its hinge between a position normal horizontal position and a vertical loading position, the forward end of the said body depending below the truck in vertical loading position and having a shovel extension detachable in connection therewith, said body having at its rear portion upper horizontal brackets and lower angular brackets, and handle bars bodily shiftable from one set of brackets to the other and detachable from both.

ALEXANDER ROY.